United States Patent
Richman

(10) Patent No.: US 7,503,252 B2
(45) Date of Patent: Mar. 17, 2009

(54) AUTOMATIC ICE CREAM SCOOPER

(76) Inventor: Debra S. Richman, 4407 Clonts Rd., Apison, TN (US) 37302

( * ) Notice: Subject to any disclaimer, the term of this patent is extended or adjusted under 35 U.S.C. 154(b) by 0 days.

(21) Appl. No.: 11/826,392

(22) Filed: Jul. 13, 2007

(65) Prior Publication Data

US 2009/0017149 A1 Jan. 15, 2009

(51) Int. Cl.
*A23G 9/28* (2006.01)

(52) U.S. Cl. .............................. 99/275; 99/632; 99/540; 99/566; 99/619; 83/915.3; 83/490; 83/165; 83/167; 83/78; 83/168; 83/88; 83/102; 425/276; 425/278; 425/281; 425/282

(58) Field of Classification Search ................ 83/915.3, 83/490, 165, 167, 78, 168, 88, 102; 425/297, 425/189, 307, 308, 118, 187, 284, 404, 444, 425/276, 277, 278, 281, 282; 99/632, 540, 99/566, 619, 275

See application file for complete search history.

(56) References Cited

U.S. PATENT DOCUMENTS

| 2,495,077 | A | | 1/1950 | Protzeller | |
|---|---|---|---|---|---|
| 2,517,107 | A | | 8/1950 | Hessert | |
| 2,638,065 | A | * | 5/1953 | Tarr | 425/278 |
| 4,469,235 | A | * | 9/1984 | Parker | 215/295 |
| 4,624,163 | A | | 11/1986 | Grace | |
| 5,189,939 | A | * | 3/1993 | Allen, Jr. | 83/878 |
| 2003/0145734 | A1 | * | 8/2003 | Ervin | 99/275 |
| 2006/0201170 | A1 | * | 9/2006 | Cole | 62/135 |

* cited by examiner

*Primary Examiner*—Jeff Aftergut
*Assistant Examiner*—Jaeyun Lee
(74) *Attorney, Agent, or Firm*—Muncy, Geissler, Olds & Lowe PLLC

(57) ABSTRACT

An automatic ice cream scooper. A cylinder of ice cream is placed vertically within a refrigerated container on a slicer having a disc shape. The slicer includes an angled slicing blade for removing ice cream. The slicer is rotated by a motor to remove the ice cream. The slicer has an upstanding edge with the screw thread formed thereon for removing the sidewall of the ice cream container.

9 Claims, 4 Drawing Sheets

US 7,503,252 B2

AUTOMATIC ICE CREAM SCOOPER

BACKGROUND OF THE INVENTION

1. Field of the Invention

The present invention relates generally to an ice cream scooper and more particularly to an automatic ice cream scooper which cuts and removes the container wall as the ice cream is removed.

2. Discussion of the Background

Traditionally, ice cream is packed in three to five gallon cylindrical cardboard containers. In order for the ice cream to be removed, it is common to use a hand scooper to remove one scoop at a time, and to place the scoop into a cone, a dish, or a container for making a shake. However, this hand operation is slow and causes the hands and wrists of the person doing the scooping to be subjected to stress. In addition, there is some concern for contamination of the product since the hand scooper is often used repeatedly.

A number of devices that have been suggested in the past to make this operation automatic and to reduce the stress on the hands of the merchant or his employee making the scoop and to make the operation faster for the convenience of the customer.

U.S. Pat. No. 2,495,077 shows one such device where a brick of ice cream is unwrapped and placed in a container vertically. A cover 36 is allowed to slide horizontally in and out so as to remove a slice of the ice cream without being handled by any person.

Likewise, U.S. Pat. No. 4,624,163 shows another arrangement where a cylindrical tub of ice cream is placed vertically between two posts and clamped into place. A motor rotates the tub while a knife assembly 60 is placed against the container wall. The container is first cut by the knife assembly and then a slice of ice cream having a similar thickness is cut using a wire 42.

Another arrangement is shown in U.S. Pat. No. 2,517,107 where a tub of ice cream B is placed on rotatable table 17 and the table is driven by a motor and gearing arrangement. Cutting elements 23 cut into the surface of the ice cream as the table is rotated. The ice cream which is removed slides down chute 25 and is fed by screws 27 and 30 into a smaller container which is sold to the customer.

While each of these devices provides a system for moving the ice cream without using a hand scooper, they have generally been found to be unsatisfactory in terms of ease of use, speed of operation and effectiveness. Accordingly, systems which overcome these difficulties are desirable.

SUMMARY OF THE INVENTION

Accordingly, the present invention provides a method for removing scoops of ice cream in an automatic fashion.

The present invention further provides for scooping ice cream while cutting away the container in which the ice cream is packed.

The present invention still further provides an automatic ice cream scooper which fits easily on a work space in a restaurant or store.

The present invention still further provides a device which automatically scoops ice cream by rotating a blade which both removes the ice cream scoop at the same time that the container wall is cut.

This is achieved by providing a refrigerated cabinet for receiving the ice cream container in a vertical orientation, which is allowed to move vertically, but not horizontally, into contact with the slicer arrangement which rotates to remove the wall of the container and scoop the ice cream at the same time.

BRIEF DESCRIPTION OF THE DRAWINGS

The present invention will become more fully understood from the detailed description given hereinbelow and the accompanying drawings, which are given by way of illustration only, and thus are not limitative of the present invention, and wherein.

DESCRIPTION OF THE PREFERRED EMBODIMENTS

Figure 1:
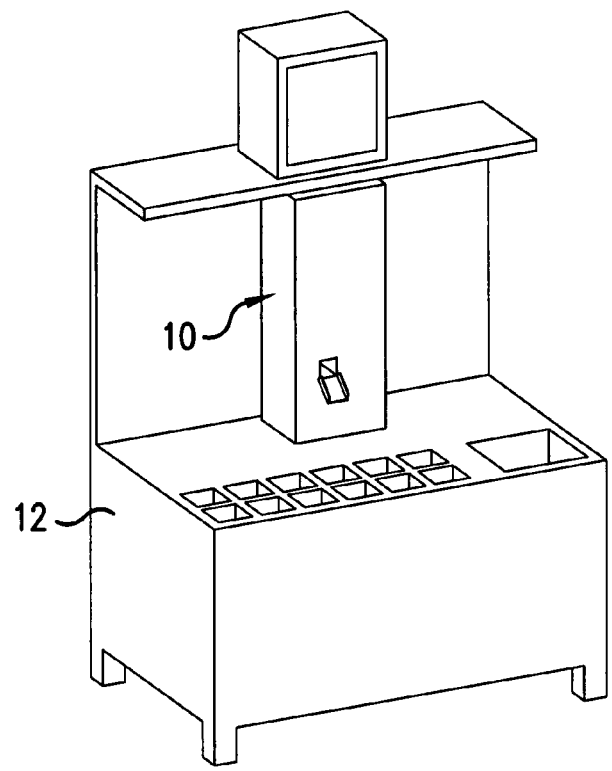
FIG. 1 is a perspective view of the present invention mounted at a work station.

Referring now to the drawings wherein like reference numerals designate identical or corresponding parts throughout the several views, and more particularly to FIG. 1, wherein the automatic ice cream scooper of the present invention is shown as 10. The ice cream scooper is placed at a work station 12 as is commonly found in a restaurant or store. The cabinet containing the ice cream scooper is compact so as to fit conveniently on the countertop and below a shelf, so that the ice cream scooper does not take up an inordinate amount of space on the countertop. While the device is shown as being mounted on a countertop at a workstation, it could be also easily mounted elsewhere, such as on a table or even hanging from a wall.

Figure 2:
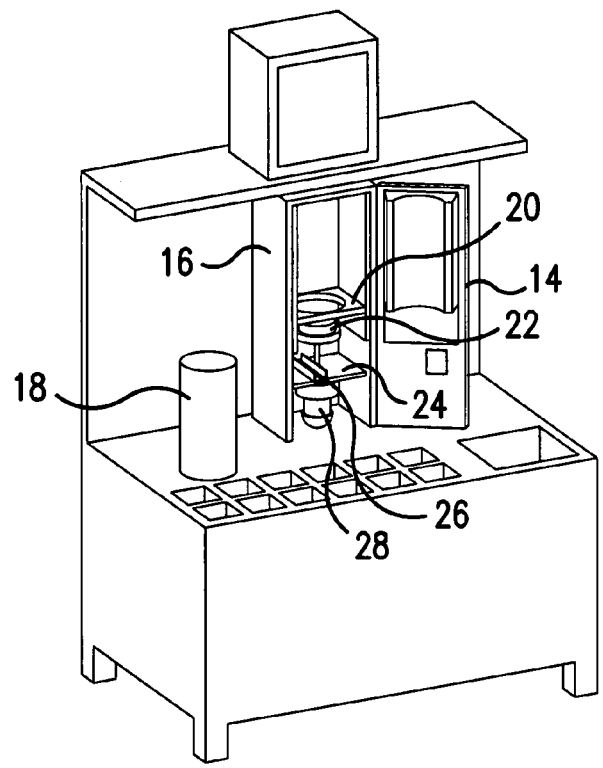
FIG. 2 is a perspective view showing the inside of the present invention with the door open.

FIG. 2 shows the ice cream scooper of the present invention with the door open showing a number of internal parts. A door 14 is mounted on a cabinet 16, which together form an insulated refrigerated container in order to maintain the ice cream in a frozen condition. A cylinder of ice cream 18 is shown sitting on the countertop, waiting to be installed in the cabinet. The cabinet contains a refrigeration mechanism which can either be part of the cabinet or mounted under the counter or elsewhere in the workstation. Of course, if desired, the refrigeration equipment can be replaced by a cold substance, such as dry ice.

Figure 3:
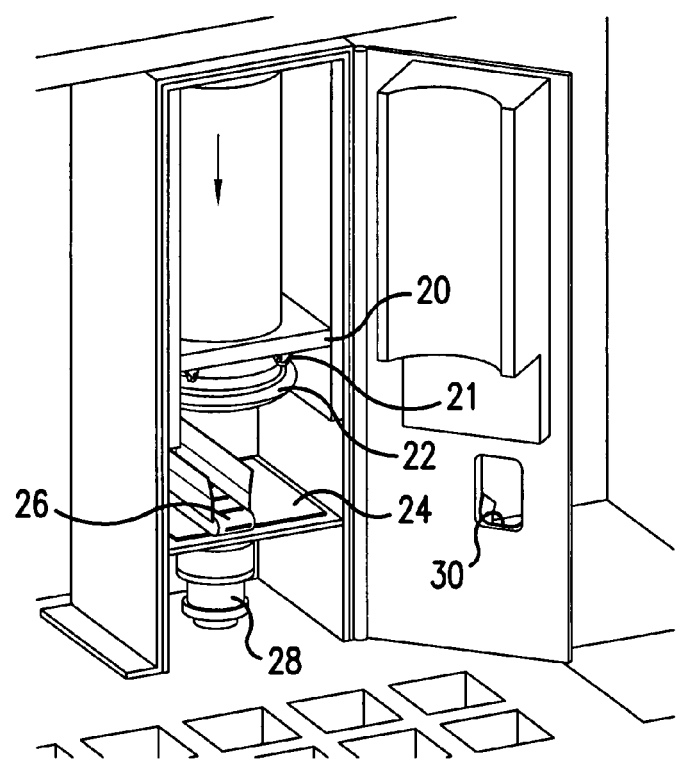
FIG. 3 shows a closer perspective view of the present invention showing details of the slicer.

As seen in FIGS. 2 and 3, the mechanism for slicing ice cream includes a guideplate 20 which has a central hole for receiving the ice cream container. Mounted on the bottom edge of the plate are rollers 21 which are free to rotate about an axle. Each axle is perpendicular to the radial direction of the central hole in the plate. Thus, when the cylindrical container is placed in the hole, the rollers support the wall of the container and allow it to move in the vertical direction, but do not allow it to move in the circumferential direction. The rollers are made of rubber so as to obtain good traction against the cylindrical wall.

A slicer apparatus 22 receives the bottom of the ice cream container. The slicer is mounted on a shaft connected to a motor 28 for rotation therewith. Since the container is prevented from rotating by the rollers 21, when the motor rotates, the slicer moves against the surface of the ice cream in the container which is fixed in the rotational direction. The motor is a standard gear motor that provides a low speed with high torque required to cut through the ice cream mix. When the motor rotates through 360 degrees, a sensor detects its position and counts one full rotation. If only one scoop is desired, the motor stops. If more than one scoop is desired, the motor continues and stops when the requisite number of scoops has been processed.

A drip tray 24 is formed as a horizontal plate to collect any material which falls from the ice cream container, so as to prevent it from falling into the motor. The drip tray may have an incline, if desired in order to force any received materials to one side for collection. A scoop chute 26 is mounted on the drip tray. The chute receives the ice cream scoops and allows them to move to an exit chute 30 which is mounted in the door. The scoop chute may be merely a gravity chute, but preferably is a motor-driven conveyor to carry the scoop toward the exit chute.

Figure 4:
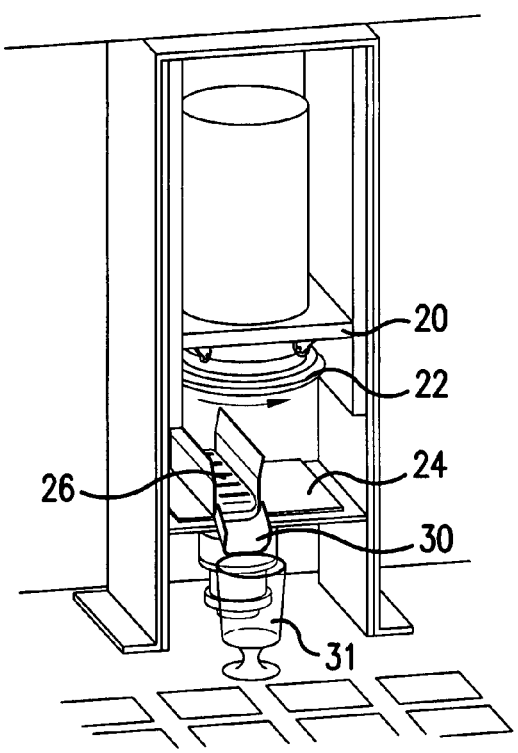
FIG. 4 shows a closer perspective view of the present invention showing details of the slicer.
Figure 5:
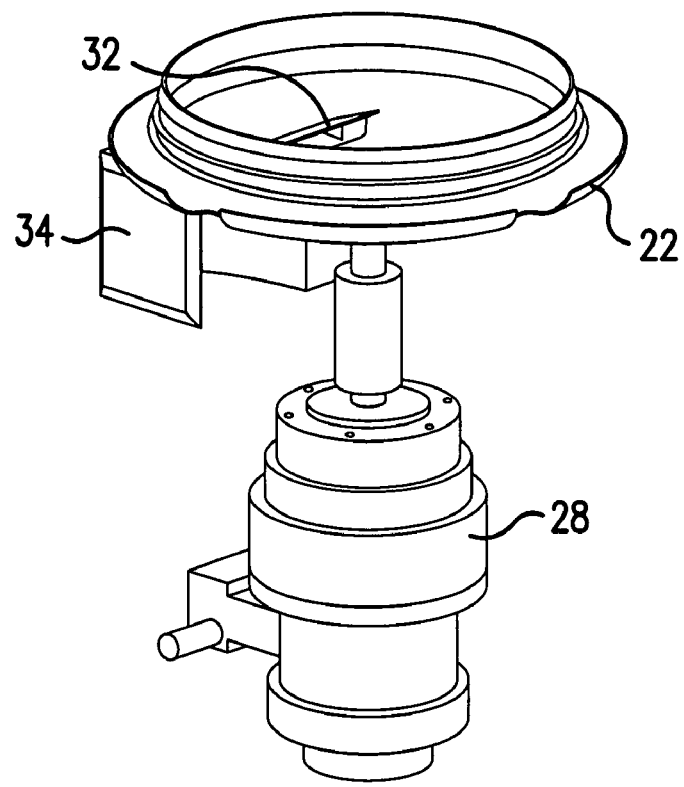
FIG. 5 is a perspective view of the motor, slicer and scoop shaper.

FIG. 4 shows the rotation (arrow) of the slicer 22 against the bottom of the ice cream container. As is better seen in FIG. 5, the motor 28 turns the slicer in a horizontal plane against the surface of the ice cream. A slicing blade 32 is mounted on the top surface of the slicer at an angle in order to remove ice cream from the bottom surface of the ice cream. The slicing blade extends in a radial direction from the center of the slicer to the peripheral edge thereof. The height of the blade from the surface of the slicer is such that the volume of the ice cream removed by the slicing blade in one 360° turn of the slicer equals the volume desired for the scoop. A scoop shaper 34 is mounted on the bottom of the slicer immediately behind the opening formed by the slicing blade 32. Accordingly, as the ice cream is removed by the slicing blade, it flows through the opening and into the scoop shaper. Due to the shape of the upper wall of the scoop shaper, the slice of ice cream is bent back on itself in order to form a "curl" which is somewhat spherical in shape. The shape of this curl is similar to that formed by a hand scoop.

Figure 6:
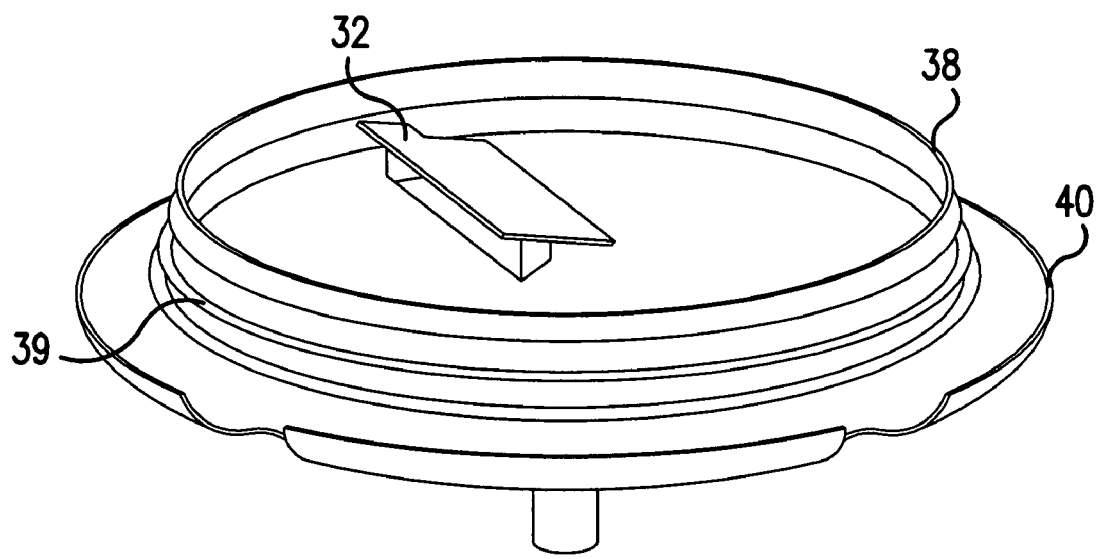
FIG. 6 is a close up view of the slicer showing the slicing blade and container shredder.

The slicer contains an upperwardly standing edge 38 (FIG. 6) which fits just inside the cylindrical wall of the ice cream container. When the container is placed in position and the slicer is rotated, a screw thread 39 formed on the outer edge of the wall 38 comes into contact with the inside of the container wall and gradually pierces it in order to split it into a continuous strip. This causes the container wall to be peeled off in a fashion similar to an apple skin peeler. A trough 40 is provided at the base of the screw thread in order to collect the peels of the ice cream container which fall thereon.

Figure 7:
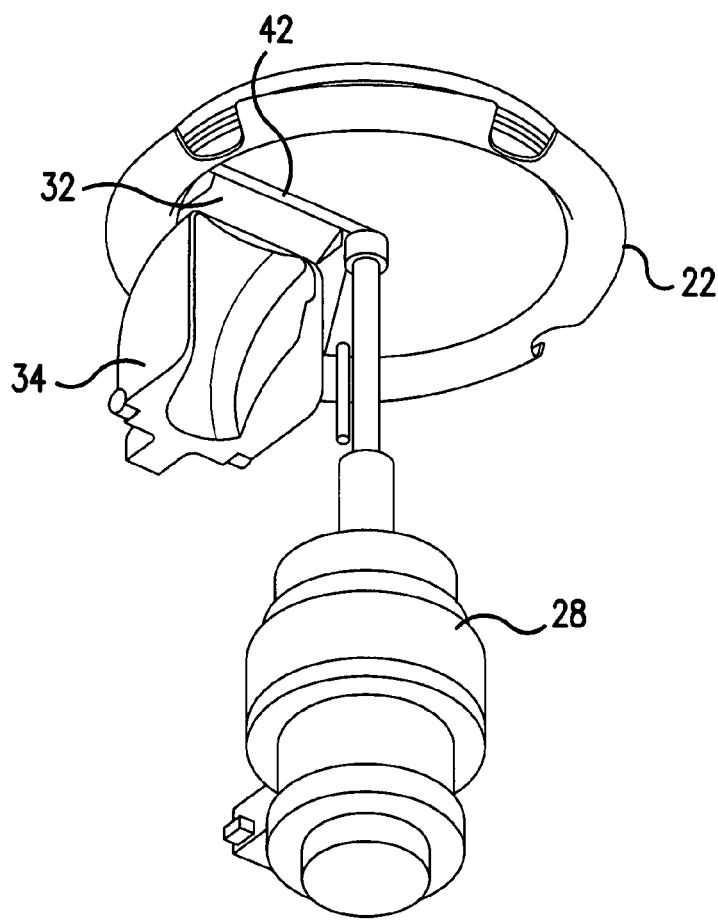
FIG. 7 is a bottom view of the slicer including the scooper.
Figure 8:
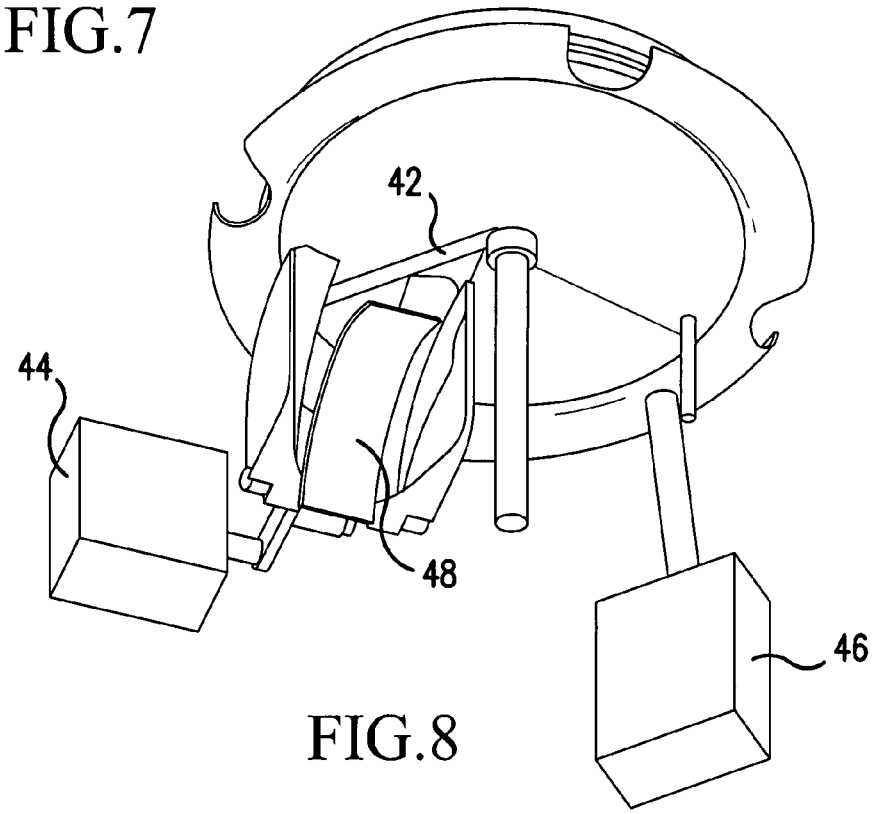
FIG. 8 is a bottom view of the slicer showing ejector.

FIG. 7 shows a bottom view of the slicer including the slicing blade 32 and the scoop shaper 34. As seen in this view, the inside of the scoop shaper is somewhat circular so as to cause the slice of ice cream to curl back on itself. When the motor has driven the slicer a full 360 degrees and the curl has been formed, a cutoff blade 42 is actuated to cut the ice cream at the slicing blade 32. Immediately following this, the ejector 48, which forms the central part of the scoop shaper "flips" the curl toward the scoop chute. As better seen in FIG. 8, the actuator for the cutoff blade 46 and the actuator for the ejector 44 are mounted on the bottom side of the cutter and are actuated by the motor control when a full 360 degree turn has been accomplished and the motor has stopped. The cutoff blade 42 has a spring coiled around the motor shaft to return the blade after it has been actuated. Likewise, the ejector pivots about an axis on which are formed springs to return it to its standard location after the curl has been ejected. The actuators 44 and 46 are simple electric motor drives having appropriate gearing to moving an actuating arm in the direction desired.

In operation, the ice cream container with the top removed is placed into the cabinet upside down above the guide plate and allowed to slide vertically into the center hole, guided by the rollers. It continues downwardly until reaching the slicer which stops its downward movement. The door is then closed causing the exit chute 30 to move into position at the end of the scooper chute. When a scoop of ice cream is desired, a button is pushed which turns on the control circuitry for driving the motor 28. The motor turns through 360° and moves the slicer at the same time. The slicer removes a volume of ice cream in a curl shape which is shaped into a scoop in the shaper 34. Once the slicer turns 360°, the motor stops. The scoop formed by the shaper is then cutoff using cutoff blade 42 and ejected using ejector 48 so that the scoop falls into the scoop chute 26. The scoop is then conveyed by a motor driven conveyor to exit chute 30 and falls into a glass, bowl, or other container 31.

It is also possible for the control mechanism to provide more than one scoop in succession if desired. It is possible to utilize a control knob or key pad to enter the number of scoops desired. The controller then causes the slicer to rotate more than once when more than one scoop is being formed.

When the slicer is rotated a complete turn, it is possible that the curl of ice cream which is being shaped into a scoop will break loose from the container by gravity. However, in order to ascertain that the scoop contains the correct amount of ice cream, the cutoff blade removes the curl from the bottom of the slicer before the curl is ejected.

As the slicer blade removes the ice cream, it also causes the ice cream container to be drawn downwardly so that there will always be contact between the ice cream and the slicer. This is, of course, aided by the weight of the ice cream container. Also, the screw thread interacts with the cylindrical wall of the container to draw it downwardly at the same time. Normally, this mechanism is sufficient to keep the ice cream and the slicer in contact. However, if desired, it would also be possible to arrange a forcing device above the ice cream container to aid it in moving downwardly. This could take the form of a heavy weight, a spring loaded plate or a pusher mechanism which moves hydraulically. However, it is preferable not to include these mechanisms in order to simplify the apparatus and to reduce the height of the overall cabinet.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

The invention claimed is:

1. An ice cream scooper comprising:
   a refrigerated cabinet for receiving a container of ice cream, said container having a tearable sidewall;
   a slicer located within the refrigerated cabinet, said slicer having a flat surface and an upstanding peripheral wall with a screw thread formed thereon;
   a motor for rotating said slicer;
   a slicing blade mounted on the flat surface of the slicer and extending at an angle for cutting into a surface of the ice cream; and
   a container remover formed by said upstanding peripheral wall and said screw thread for interacting with said sidewall of said container, for tearing and removing said sidewall at the same time that ice cream is cut by said slicing blade.

2. The ice cream scooper according to claim 1, further comprising a scooper shaper mounted on a bottom surface of said slicer for receiving ice cream cut by said slicing blade for forming an ice cream scoop.

3. The ice cream scooper according to claim 2, further comprising a scoop chute aligned with said scoop shaper for receiving the ice cream scoop and removing it from said cabinet.

4. The ice cream scooper according to claim 3, wherein said cabinet includes a door having an opening and an exit chute mounted therein which receives an ice cream scoop from the scoop chute for directing the scoop to its desired location.

5. The ice cream scooper according to claim 3, wherein the scoop chute contains a conveyor.

6. The ice cream scooper according to claim 1, further comprising a guide plate fixedly mounted within said cabinet and having a central opening for receiving said ice cream container.

7. The ice cream scooper according to claim 6, further comprising rollers mounted on a bottom surface of said guide plate for preventing circumferential movement of said container.

8. The ice cream scooper according to claim 1, further comprising a cutoff blade for cutting off the ice cream which has been cut by the slicing blade.

9. The ice cream scooper according to claim 2, wherein said scooper shaper includes an ejector for removing said ice cream scoop from said scooper shaper.

* * * * *